(No Model.)
H. DUNCAN.
APPARATUS FOR FACILITATING THE MICROSCOPICAL EXAMINATION OF PHOTOGRAPHIC PICTURES.
No. 443,359. Patented Dec. 23, 1890.
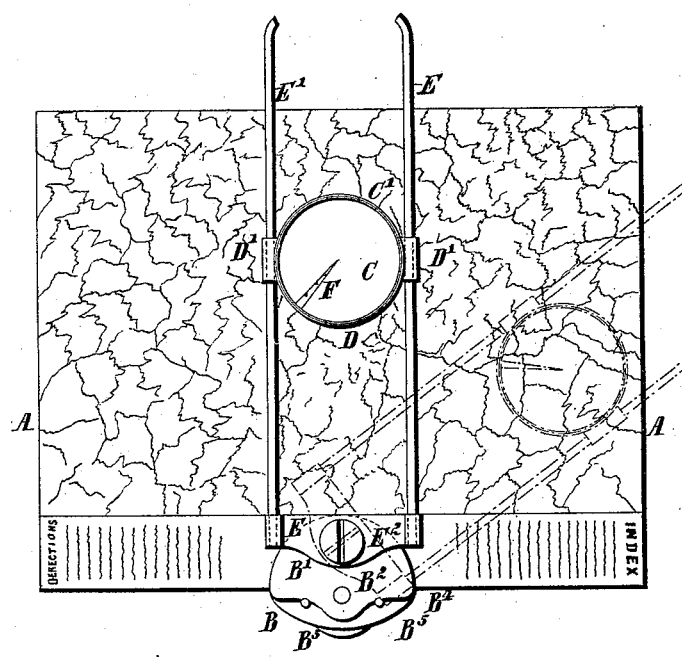
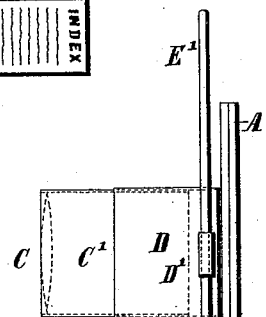
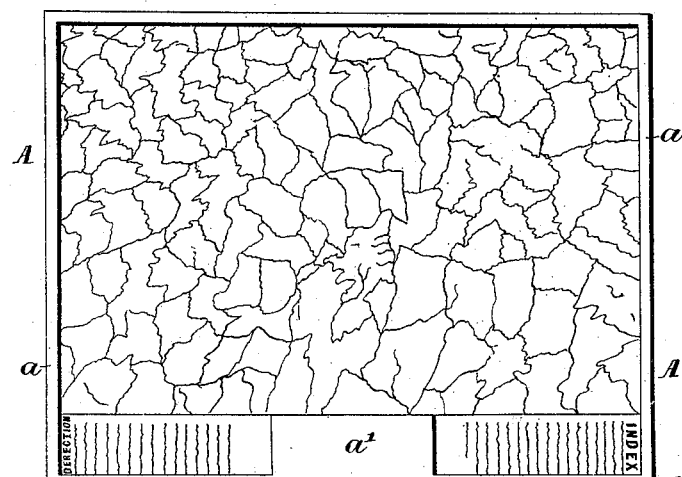

United States Patent Office.

HENRY DUNCAN, OF LONDON, ENGLAND.

APPARATUS FOR FACILITATING THE MICROSCOPICAL EXAMINATION OF PHOTOGRAPHIC PICTURES.

SPECIFICATION forming part of Letters Patent No. 443,359, dated December 23, 1890.

Application filed June 12, 1890. Serial No. 355,187. (No model.)

*To all whom it may concern:*

Be it known that I, HENRY DUNCAN, stock-broker, a subject of the Queen of Great Britain, and a resident of London, England, have invented certain new and useful Improvements in Apparatus for Facilitating the Microscopical Examination of Photographic Pictures, Maps, and other Objects, of which the following is a specification, reference being had to the accompanying drawings.

My invention relates to apparatus for facilitating the microscopical examination of photographic pictures, maps and documents, and other small or microscopic objects.

My invention is chiefly designed to afford the means whereby reduced photographs of maps or the like, which, while occupying a comparatively small space, correspond to a very large area, can be examined with great facility.

My improved apparatus is, by reason of its compactness and portability, very serviceable to bicyclists and tourists and for military and other purposes where ordinary maps would be inconvenient or objectionable by reason of their bulk or by reason of the difficulty of using them, especially in stormy or wet weather.

An important feature of my said invention is the provision of suitable means whereby the microscope may be readily adjusted so as to include in its field any desired portion of the said map or other object. By this means with a comparatively small lens it is possible to examine objects which as a whole occupy an area very much larger than the field of such lens. For example, any part of a small-scale map showing an area of, say, seven or eight hundred square miles may be examined by adjusting the microscope, as required, relatively to the said map. Moreover, after the adjustment of the lens, as required, the apparatus can, if desired, be held in one hand during the examination of the map, the other hand being left free for other purposes.

In constructing an apparatus according to my said invention I arrange the lens or lenses in a suitable tube or holder, and I provide suitable means for adjusting the lens or lenses in any direction relatively to the map, picture, or the like, as hereinafter described.

In the accompanying drawings I have shown how my said invention may be conveniently and advantageously carried into practice.

Figure 1 is a front elevation, and Fig. 2 a side elevation, showing my improvements applied to a miniature map. Fig. 3 is a front elevation illustrating a slight modification of my said invention.

A A are sheets of glass, plain or bound in a light metal frame with a map between them.

B is a frame, clip, or holder for the glass. This frame or holder may, if desired, extend entirely around the glass. I prefer, however, to make it, as shown, in the form of a clip or clamp, so that the glass can be very readily removed from or replaced in it.

C is the lens, which is secured in a tube $C'$, fitted to slide in a socket or holder D, provided with lugs or projections $D'$. Through these lugs are passed arms or guides $E'$, fixed in a cross-piece E, which is pivoted at $E^2$ to the clip or holder B. This clip or holder comprises a plate $B'$, in which the pivot $E^2$ is fixed, and which bears against one side of the glass. This plate is provided with a screw $B^2$, having a thumb-nut $B^3$, or a suitable nut adapted to be turned by a key or otherwise in cases where the projections of the thumb-nut are objectionable. A second plate $B^4$ bears against the other side of the glass, and is provided with a hole through which the screw $B^2$ is passed. The said thumb-nut $B^3$ when tightened presses the plate $B^4$ toward the plate $B'$, thus clamping the glass firmly between the said plates. The plate $B^4$ is provided with guiding pins or projections $B^5$, which fit into holes or notches in the plate $B'$ and serve to retain the said plates in their proper relative position and facilitate the application of the clip or holder to the glass. By turning the guides $E'$, which may in some cases be connected together at their outer extremities about the pivot $E^2$, and moving the lens-holder D in one or the other direction along the said guides, as required, the lens C may be freely moved in any direction over the map or other object to be examined, and the field of the lens thus caused to include any desired part of the said map or other object.

To prevent fracture of the glass by the pressure of the plates $B'$ and $B^4$ thereon, I sometimes attach a piece of leather or other suitable material to the inner surface of the plate B' and plate B¹ or place upon the plate B⁴ one or more rings B⁶ of india-rubber or other soft elastic or suitable material. In other cases I provide one or more cushions or pads on the glass. The cushion or pad may be of one piece and may extend around that part of the edge of the glass and frame to which it is desired to attach the clip. It is formed, preferably, of leather, india-rubber, gutta-percha, or similar material, and is secured to the glass in any suitable manner. By arranging the said cushion or pad to extend over the edge of the glass I provide very effectually for preventing fracture of the glass in applying the clip or holder thereto. Moreover, by attaching the said cushions or pads to the glass instead of to the clip or holder I provide for facilitating the application of the said clip or holder to the glass. In some instances I provide the glass with a metal frame $a$, extending all around it, as shown in Fig. 3, and having widened portions $a'$, which serve the same purpose as the cushions or pads.

Another means of attaching the glass to the frame is to perforate the glass and pass a screw through the same to connect the two plates B' B⁴, suitable cushions or pads being provided between the glass and the plate to prevent fracture of the glass.

To diminish the bulk of the apparatus as much as possible, I sometimes provide a tube for the lens or lenses made up of several small sections adapted to slide one within the other telescopically, so that the whole may be closed together and will then occupy but a small space. I may, however, arrange the said lens in any other suitable manner for the purpose of my said invention.

The map is preferably photographed upon one sheet or plate of glass, and a second sheet or plate of glass or other transparent material is then secured over the map to protect the same. I find it advantageous to have the outer side of one of these two sheets of glass—namely, that at the back of the map—slightly frosted or ground, so that reference-marks can with facility be made thereon by means of a pencil or other suitable instrument. It is obvious, however, that, if desired, the reduced map or the like may for the purpose of my invention be photographed or otherwise produced upon opaque or semi-opaque substances instead of upon glass or other transparent material.

A pointer F is sometimes provided, which projects inward from the wall of the lens-holder D to, or approximately to, the center of the field of the lens. When it is desired to indicate the position of some place on the map by a special mark, this operation is greatly facilitated by the use of the said pointer, which can be adjusted so that its point coincides with the spot to be marked, and which, by reason of its being visible through the slightly-ground glass, will enable the mark to be made thereon at the spot indicated by the pointer at the time of observation or after the microscope has been removed from the eye. This pointer is provided with notches disposed at intervals along the edge of the same, and the point on the map may, if desired, be marked by reference to these notches.

In cases where the pointer is not used I mark the map by simply holding the same to the light, as in examining the map, and indicating the position by a pencil-mark or otherwise on the frosted glass at the rear side thereof.

I sometimes secure in a suitable socket or recess in the frame or clip B—for instance, in the plate B' thereof—a small compass, whereby the bearing of any place may be readily ascertained.

To facilitate reference and to assist in finding places on the map, a series of numbers are marked along one edge thereof and a series of letters along another edge thereof at right angles to the first, and an index to the more important places on the map and referring to the said numbers and letters is printed or otherwise marked in microscopic characters on the glass in a marginal space thereon. I sometimes also provide in such marginal space in microscopic type or characters the directions for the use of the map or other information likely to be of service.

It is evident that several different maps can be carried in a suitable case and used, as required, in my improved apparatus. The apparatus is, moreover, applicable for the examination of portraits, views, or the like, several of which may be photographed on one sheet of glass or other material.

I can, if desired, make the clip with a spring instead of with a screw for fastening it on the glass. Moreover, instead of the clip I can use a frame or holder extending entirely around the glass and having the lens-holder fitted to slide in suitable guides therein, the said guides being capable of angular movement or rotation relatively thereto or being capable of movement in a direction at right angles to that of the lens-holder.

What I claim is—

1. An apparatus for facilitating the microscopical examination of photographic maps and other objects, comprising a frame, clip, or holder for the map or other object and a microscope or magnifier arranged to slide to and fro in or upon guides which are secured to the said frame, clip, or holder and which are capable of angular or other movement relatively to the map or the like, substantially as hereinbefore described, for the purpose specified.

2. The combination, with one or more photographs on a sheet of glass or other suitable material, of a frame or clip for supporting the same and a lens or lenses secured in a holder which is adapted to slide between guides pivoted to the said frame or clip, substantially as described.

3. The combination, with one or more sheets or plates of glass or other material having between them a photograph of a map and one of which is frosted or ground or similarly prepared on its outer side, of a frame or clip for supporting the same and a lens or lenses secured in a holder which is adapted to slide between guides pivoted to the frame or clip, substantially as described.

4. The clip or holder comprising the clamping-plates, the guiding pins or studs, and a screw or other suitable device for pressing the said plates together, substantially as and for the purposes set forth.

5. The combination, with the adjustable lens-holder, of a hand or pointer projecting inwardly from the circumference toward the center of the said lens for facilitating the marking of places on the map, substantially as described.

6. The combination, with a photograph of a map or the like on glass or other material and provided with one or more cushions, pads, or the like for protecting the said glass or other material, of a frame or clip and a lens secured in a holder which is adapted to slide between guides pivoted to the said frame or clip, substantially as and for the purposes set forth.

In testimony whereof I have hereunto signed my name in the presence of two subscribing witnesses.

HENRY DUNCAN.

Witnesses:
 JOHN D. VENN,
9 *Gracechurch Street, London.*
 WALTER J. SKERTEN,
17 *Gracechurch Street, London, E. C.*